(12) United States Patent
Plaumann et al.

(10) Patent No.: US 7,620,871 B2
(45) Date of Patent: Nov. 17, 2009

(54) METHOD AND MEASURING DEVICE FOR DETERMINING AN ERROR RATE WITHOUT INCREMENTAL REDUNDANCY

(75) Inventors: Ralf Plaumann, Forstern (DE); Max Winklhofer, Munich (DE); Johannes Fassrainer, Assling (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 339 days.

(21) Appl. No.: 10/552,361

(22) PCT Filed: Mar. 4, 2004

(86) PCT No.: PCT/EP2004/002218

§ 371 (c)(1),
(2), (4) Date: Nov. 27, 2006

(87) PCT Pub. No.: WO2004/088909

PCT Pub. Date: Oct. 14, 2004

(65) Prior Publication Data

US 2007/0165671 A1 Jul. 19, 2007

(30) Foreign Application Priority Data

Apr. 3, 2003 (DE) .................................. 103 15 249

(51) Int. Cl.
*H03M 13/03* (2006.01)
*H04L 1/18* (2006.01)
(52) U.S. Cl. .................... 714/751; 714/748; 714/752
(58) Field of Classification Search ................. 714/751, 714/748, 752; 370/218
See application file for complete search history.

(56) References Cited

U.S. PATENT DOCUMENTS

| 5,657,325 | A | | 8/1997 | Lou et al. |
| 5,983,382 | A | * | 11/1999 | Pauls .......................... 714/744 |
| 2002/0053058 | A1 | * | 5/2002 | Lee et al. .................... 714/748 |

FOREIGN PATENT DOCUMENTS

| DE | 4016173 | 11/1991 |
| DE | 69509905 T | 10/1999 |
| DE | 10219099 A1 | 11/2003 |
| EP | 1120932 | 8/2001 |
| EP | 1244240 A2 | 9/2002 |
| EP | 1261163 A2 | 11/2002 |
| WO | WO 01/22645 A1 | 3/2001 |

OTHER PUBLICATIONS

EP, International Preliminary Report on Patentability, Apr. 24, 2006.

* cited by examiner

*Primary Examiner*—Guy J Lamarre
*Assistant Examiner*—Sam Rizk
(74) *Attorney, Agent, or Firm*—Ditthavong Mori & Steiner, P.C.

(57) ABSTRACT

A method and device are described for determining an error rate during transmission from a transmitter/receiver station to a transmitter/receiver device and a measuring device. A first data block and at least one other and different redundant block is received by the transmitter/receiver device, decoded, and checked for transmission errors. If an error is ascertained in the first data block, another redundant block is requested, but in response the first data block is retransmitted instead.

10 Claims, 4 Drawing Sheets

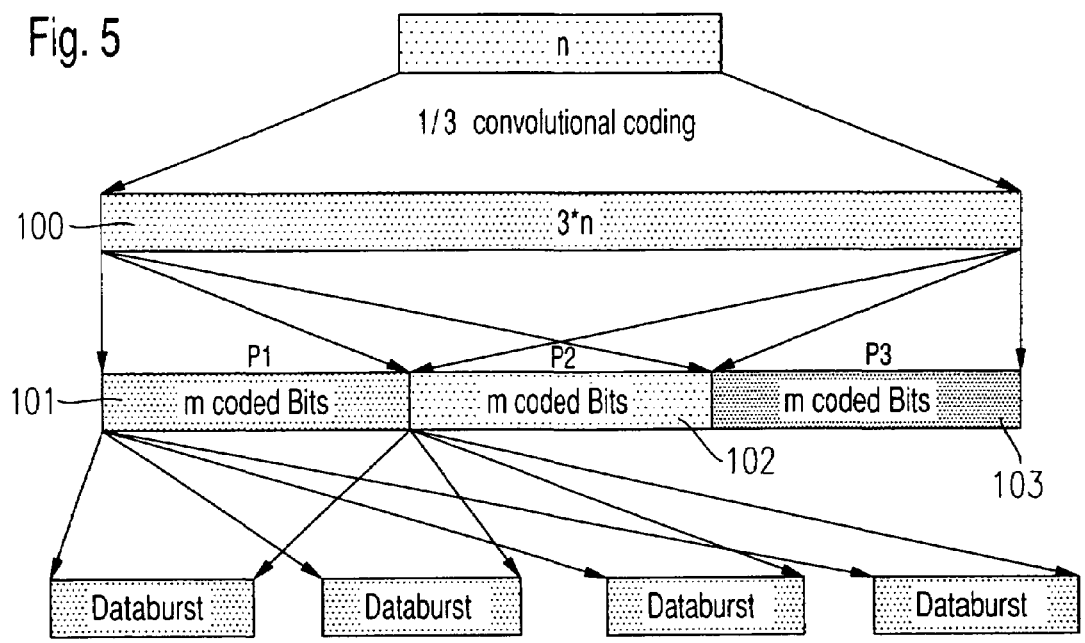
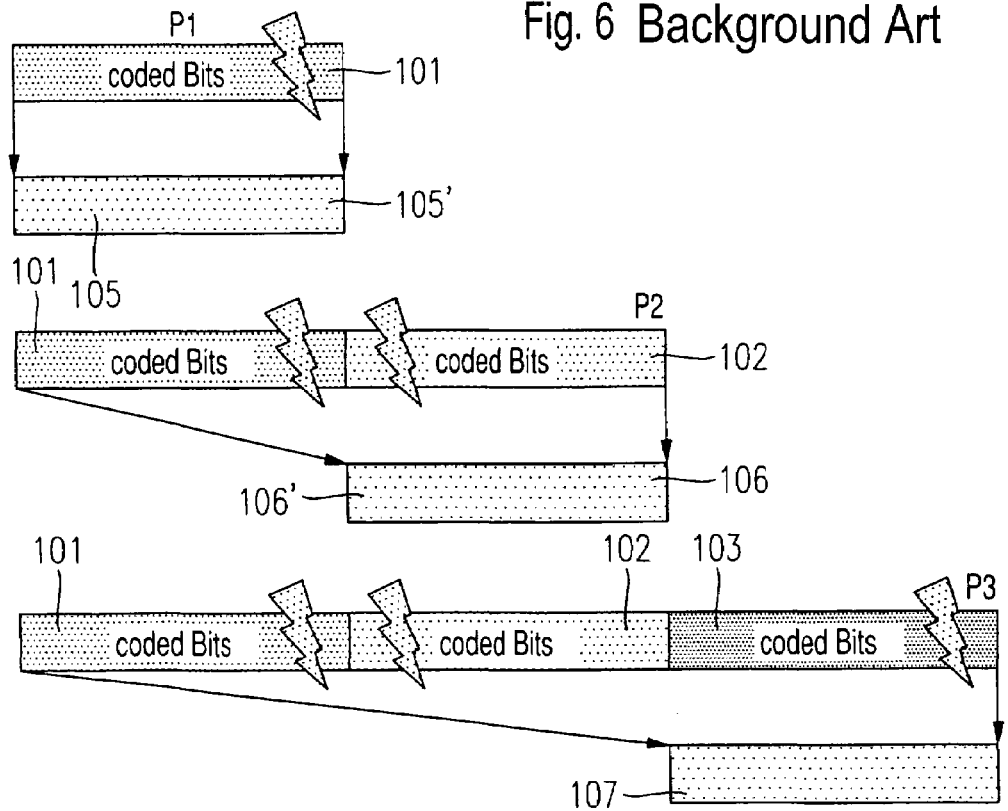

METHOD AND MEASURING DEVICE FOR DETERMINING AN ERROR RATE WITHOUT INCREMENTAL REDUNDANCY

FIELD OF THE INVENTION

The invention relates to a method and a measuring device for determining an error rate in a data transmission from a transmitter/receiver station to a transmitter/receiver device, i.e. the decoding gain when using incremental redundancy.

BACKGROUND OF THE INVENTION

Errors can occur during the transmission of data from a transmitter/receiver station, for example, a base station of a mobile telephone system, to a transmitter/receiver device, for example, a mobile telephone, and during the decoding implemented in that context. In determining error rates for that context, a data transmission is generally carried out between a measuring device and the mobile telephone, wherein the base station of the mobile telephone system is emulated by the measuring device. In this context, the measuring device is structured in such a manner that, like the base station itself, it fulfills all requirements of the relevant standard, that is to say, it also supports measures for software-assisted error correction.

With more recent mobile-telephone systems, for example, in the standard for EGPRS (Enhance General Packet Radio Service), an incremental increase in redundancy is implemented in order to increase security during transmission of data. This means that after the transmission of a first data block coded according to a given convolutional coding scheme, tests are carried out at the receiver end to determine whether the transmission and the decoding of the received data has taken place without error. If the data record received in this manner contains errors, the transmission of further, redundant data from the base station is requested by the receiver.

This so-called "Incremental Redundancy" is described, for example, in U.S. Pat. No. 5,657,325.

In this context, the redundant data are generated together with the first data block from an originally entered data record by convolutional coding, wherein redundant information is generated for each item of information in the original data record. For example, with the coder MCS9 in the context of the EGPRS standard, three bits are generated from every bit. To avoid the necessity to transmit this threefold data volume in every case, bits are removed from this threefold data volume according to a punctuation scheme and stored in a memory. The remaining bits are transmitted as a first data block to the receiver, where they are evaluated.

In the event of an error transmission and evaluation of the first data block received, the receiver reports the error reception of the data to the transmitter, whereupon redundant data in a second data block, formed according to a second punctuation scheme by the elimination of bits from the threefold data volume, are transmitted to the receiver. Using these redundant data, the errors, which have occurred in the reception of the first data block can be corrected or another redundant data block is again requested.

In the context of a production testing system, for example, for evaluating the quality of a mobile telephone, the procedure described provides the disadvantage that when determining an error rate, which is caused by the mobile telephone, the errors originally occurring during the transmission are eliminated as a result of the incremental redundancy, and an evaluation of the actual errors caused by the hardware of the mobile telephone without correction by the software using the redundant data is therefore not possible.

SUMMARY OF THE INVENTION

A need therefore exists for providing a method and a measuring device, with which the error rate for a transmitter/receiver device is determined without an error correction with redundant data.

According to the method of an aspect of the invention, in order to test the correctness of the transmitted data after the transmission and decoding, a check parameter for the original data is added from an original data record to the original data block, initially through a method as used e.g. in the operation of a base station according to the EGPRS standard. The original data block is coded by convolutional coding together with the check parameter, so that an enlarged data volume is generated, in which the original information of the original data block is present in a multiply redundant manner.

Several data blocks are generated from this enlarged data volume, each data block containing the information of the original data block including the check parameter, but often no other redundant information. A first data block of this kind is modulated and amplified by a transmitter/receiver station of the measuring device in a known manner and finally transmitted via an antenna.

This first transmitted data block is received by a transmitter/receiver device, i.e. the device under test (DUT), and decoded according to the coding scheme ("convolutional code") of the transmitter/receiver station. The data record obtained in this manner is checked on the basis of the check parameter with reference to its agreement with the original data block. In this context, if an error in the transmission and the decoding is determined in the transmitter/receiver device, then the transmitter/receiver device requests a transmission of a further, redundant data block from transmitter/receiver station.

This request from the transmitter/receiver device is received by the transmitter/receiver station, whereupon the same data block, which was originally transmitted, is transmitted again. As a result of this retransmission of the same data block, the transmitter/receiver device receives no redundant information and cannot therefore correct a decoding error using incremental redundancy. The errors actually occurring in the transmission of data as a result of the device can therefore be determined with this method.

Additional aspects of some embodiments of the invention relate to further developments of the method and the measuring device.

For example, in generating the redundant data blocks, it is particularly advantageous if, instead of the various, redundant data blocks, the same data block, which is provided for the first transmission, is stored at all of the memory positions provided in a memory for the various redundant data blocks. The further selection of a given data block in the event of the new request by the transmitter/receiver device is then no longer necessary. For example, after an error transmission, if a second, redundant data block is requested, the data block stored at the memory position of the second, redundant data block can then simply be transmitted, because this is identical to the previously transmitted data block.

According to a further advantageous development of the invention, a redundant data block is stored in each of the various memory positions of the memory. In order to determine the error rate without an error correction, the respective data block, which was originally transmitted, is selected by a selection device independently of the requested transmission of a further redundant data block. This is particularly advantageous, if the error rate which occurs when using redundant information is also to be determined in addition to the error rate without an error correction. In a case of this kind, according to a further advantageous embodiment, the redundant information requested on the basis of a request by the transmitter/receiver device for a redundant data block from the transmitter/receiver station can actually be transmitted by sending a data block stored in the memory.

Furthermore, it is particularly advantageous to be able to alter the punctuation scheme used, in order to determine in a targeted manner the error rate caused by the hardware in each case for different punctuation schemes.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Preferred exemplary embodiments of the invention are explained in greater detail below on the basis of the drawings. The drawings are as follows:

FIG. 5 shows a schematic presentation of the generation and transmission according to the invention of data blocks; and FIG. 6 shows a schematic presentation of error correction by means of incremental redundancy.

DETAILED DESCRIPTION OF THE PREFERRED EMBODIMENT

Figure 1:
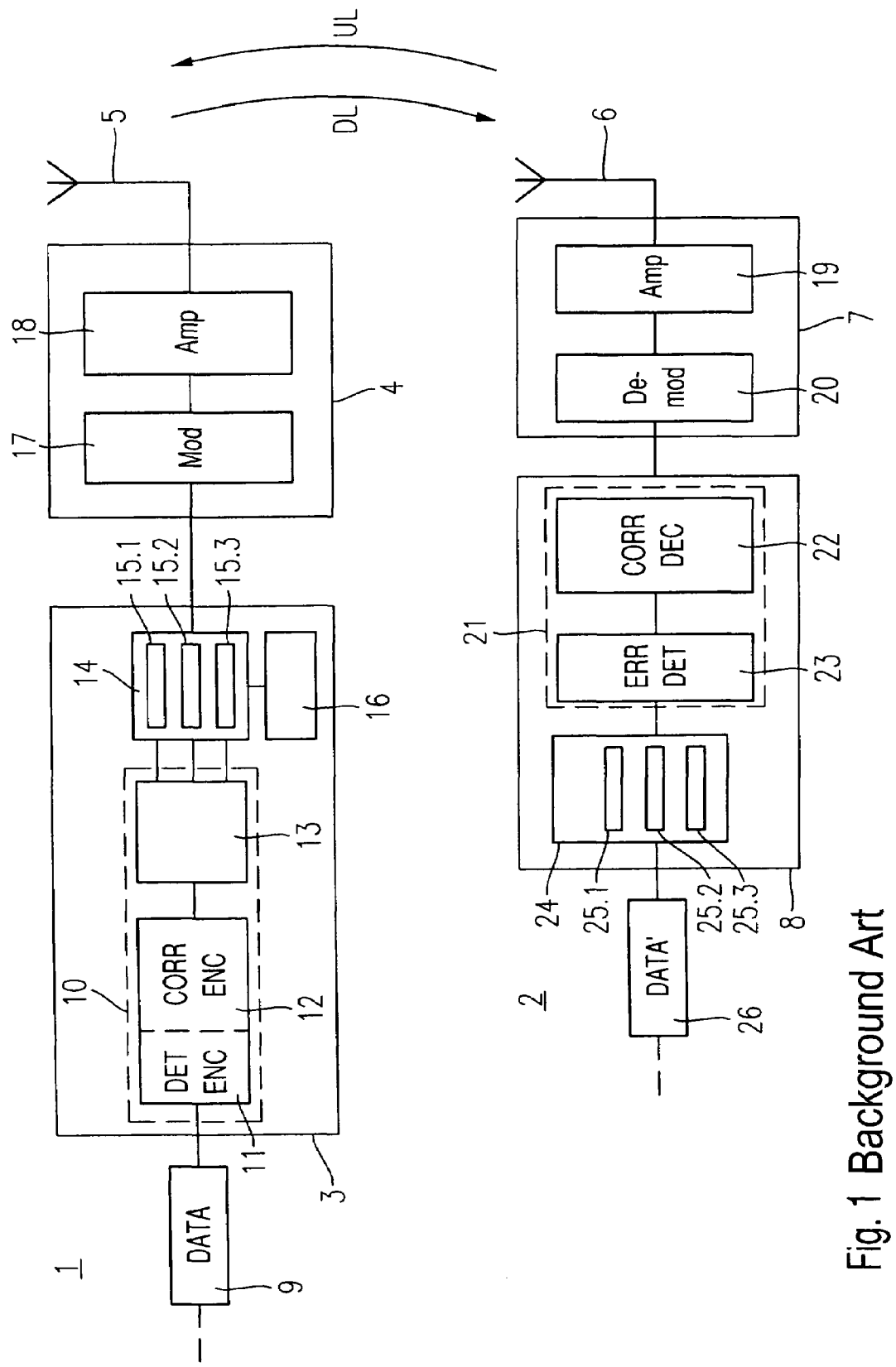
FIG. 1 shows a schematic presentation of the structure of a transmitter/receiver station and a transmitter/receiver device for determining an error rate.

Before the method according to the invention is explained in detail, the transmission of data using incremental redundancy will first be explained with reference to FIG. 1. Data transmission takes place via an air interface, information being transmitted both from a transmitter/receiver station 1 to a transmitter/receiver device 2 and also vice versa.

The data to be transmitted, which are present in digital form, are first processed by a coding block 3 in the transmitter/receiver station 1. The data output from the coding block 3 are modulated in a transmitter/receiver block 4, amplified and then transmitted via an antenna 5.

The signals transmitted by the antenna 5 are received by an antenna 6 of the transmitter/receiver device 2 and supplied to a transmitter/receiver block 7 of the transmitter/receiver device 2. The transmitter/receiver block 7 is connected to a decoding block 8, in which the original data are recovered from the coded data and checked for correctness.

The data are coded in the coding block 3, which, for this purpose, receives an original data block 9, for example, of 600 bits length, at its input end and initially supplies this to a check-parameter section 11 of data block generator 10. In the check-parameter section 11, a check parameter, which is calculated from the data of the original data block 9, is added to the original data block 9. A check parameter of this type can be determined, for example, using a CRC method (cyclic redundancy check). The original data block 9 is then supplied together with the check parameter to a coding section 12.

In the coding section 12, additional redundant data are generated from the original data of the original data block 9 together with the check parameter by convolutional coding, for which purpose a so-called "convolutional coder" is used. In this context, for example, in the case of a ⅓ coder, a second and third redundant bit are generated for each bit of the original data block 9 and the check parameter, as shown in FIG. 5.

The data record 100 contains multiply redundant information both with regard to the original data block 9 and also the added check parameter. To avoid unnecessary data transmission, redundant bits are removed from the data record generated in this manner, in punctuation section 13 of data block generator 10 (FIG. 1), with the assistance of a given punctuation scheme P1, so that finally, a first data block 101 remains, which contains the information of the original data block 9 and the check parameter without redundant information.

Moreover, further redundant bits are removed in the punctuation section 13 using a further punctuation scheme P2, thereby forming a second data block 102, which differs from the first data block 101, but contains the same information as the first data block 101. In the same manner, a third, also redundant data block 103 is generated using a third punctuation scheme P3.

The first, second and third data blocks are stored in memory positions 15.1, 15.2 and 15.3 of a memory 14 provided for this purpose. Using a selection device 16, the data blocks stored in the memory positions 15.1 to 15.3 can be removed from the memory and supplied to the transmitter/receiver block 4 of the transmitter/receiver station 1. If a first transmission of the information is provided for an original data block 9, then, for example, the first data block, which is stored, for example, in memory position 15.1, is always supplied to the transmitter/receiver block 4. Alternatively, the data blocks can also be newly generated in a continuous manner.

The transmitter/receiver block 4 comprises the devices required for processing the first data block; by way of example, only a modulator 17 and amplifier are illustrated. After the first data block has been modulated in the modulator 17, it is amplified by the amplifier 18, so that it can then be transmitted via the antenna 5.

If the transmitter/receiver block 7 of the transmitter/receiver device 2 receives this signal via the antenna 6, then, in the transmitter/receiver block 7, the received signal is first amplified in a reception amplifier 19 and then demodulated in a known manner in a demodulator 20. The demodulated data of the first data block received are then supplied to the data block generator 21 of decoding block 8, where they are initially decoded in a decoding section 22 using the coding method used in the coding section 12.

The data from the first data block now present in decoded form are checked in a check section 23 of data block generator 21 with reference to their identity with the original data block 9. If the data determined from the first transmitted data block and the original data block 9 are found to be identical, a new original data block can be transmitted in a subsequent stage via the connection between the transmitter/receiver station 1 and the transmitter/receiver device 2.

By contrast, if the check section 23 determines that the data determined from the first data block transmitted do not agree with the original data block, then the data determined from the first transmitted data block are stored in a first storage position 25.1 of a receiver memory 24. In order to obtain the complete information using these already-received data, the transmitter/receiver device 2 transmits a signal to the transmitter/receiver station 1 requesting a further, redundant data block, in order to correct the errors using the further redundant data. In this context, because of the different data blocks, the second data block also need not be transmitted in a completely error-free manner, in order to guarantee adequate redundancy for an error correction.

On the basis of this request, a different data block from the previously-transmitted data block is selected by the selection device 16 in the transmitter/receiver station 1, for example, the data block, which is stored in the second memory position 15.2 of the memory 14. Another evaluation is implemented in the decoding block 8 with the data of the second data block received, which is redundant to the already-received first data block. If the complete correctness of the data determined and therefore an error free transmission is still not achieved in spite of the redundant information, the data determined from the second transmitted data block 102 are stored in a second memory position 25.2 of the receiver memory 24.

Following this, the transmitter/receiver device 2 once again transmits a signal requesting a further redundant data block, whereupon the third data block, which is stored in the third memory position 15.3 of the memory 14, is selected by the selection device 16, and the third data block is supplied to the transmitter/receiver block 4 for transmission.

This procedure for the correction of errors is illustrated schematically in FIG. 6. Useful data 105 are determined from a first, transmitted data block 101, which originated from the use of a first punctuation scheme P1. A portion 105' of the useful data 105 in this context contains errors. Even after the reception and decoding of a second data block 102 generated using a second punctuation scheme P2, errors 106', which were determined with the information from the first and second data blocks 101 and 102, may still be contained in the useful data 106. Finally, the retransmission of redundant information in the form of a third data block 103 generated with a third punctuation scheme can lead to a correct communication of the useful data 107 of the original data blocks 9. If this is still not the case, the transmission of the data block 101 generated with the first punctuation scheme P1 is again continued.

According to the invention, however, specifically for testing purposes, in the event of a request for a further data block, a transmission by the selection device 16 of a further data block redundant to the previously-transmitted data block is prevented. In evaluating the data of a first data block received, if the check section 23 determines that the determined data do not agree with the original data block 9, a signal requesting a further redundant data block is transmitted from the transmitter/receiver device 2, as is also the case in the real operational conditions described above. The transmitter/receiver device 2 cannot detect that a test is being carried out.

By contrast with operation with a real base station, however, to prevent a software error correction from concealing a hardware error, the same data block, which led to the error evaluation, is retransmitted by the transmitter/receiver station 1 associated with the measuring device, which emulates a real base station, as shown for the first data block 101 in FIG. 5. For this purpose, the selection device 16 can again access, for example, the first memory position 15.1 of the memory 14.

Alternatively, in generating the redundant data blocks, the first memory position 15.1, the second memory position 15.2 and the third memory position 15.3 of the memory 14 can also each be occupied with the same data block instead of with redundant data blocks. After a transmission 26 of the first data block by the transmitter/receiver device 2, if a further, redundant data block is requested via a response signal, the data block stored in the second memory position 15.2 can then actually be selected by the selection device 16. In this manner, the same algorithm for selecting a data block can be used as in the case of a real base station, but without communicating redundant information to the transmitter/receiver device 2.

Figure 2:
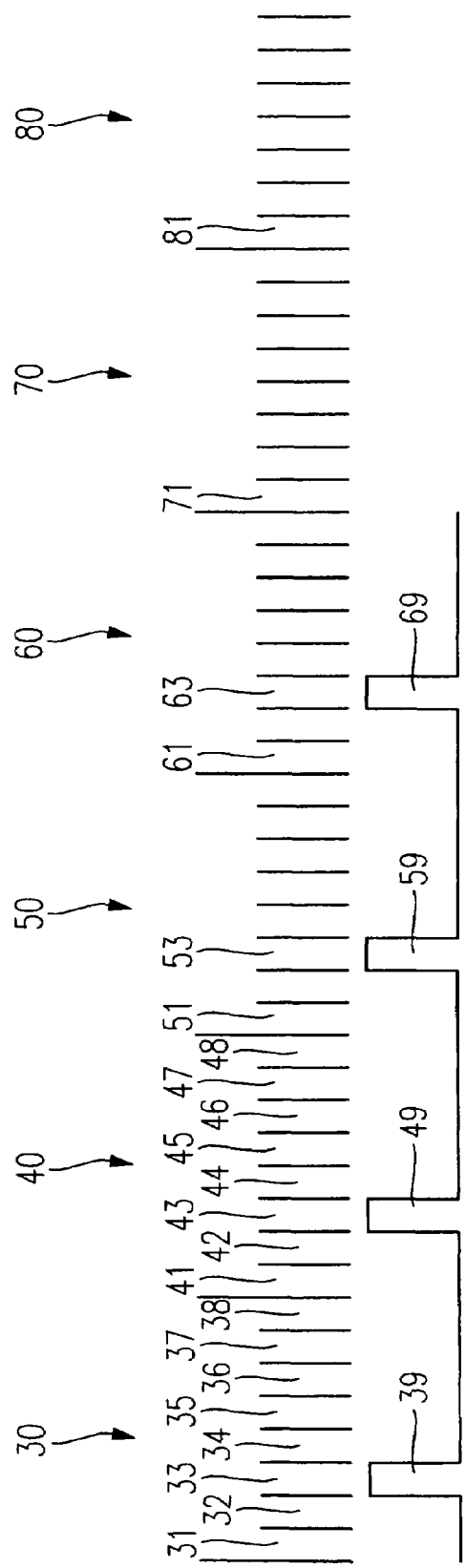
FIG. 2 shows a schematic presentation of the transmission of data in data blocks in the context of EGPRS.

FIG. 2 illustrates the data transmission for a mobile telephone system according to the EGPRS standard in a considerably simplified form. The data are transmitted between the transmitter/receiver station 1 and the transmitter/receiver device 2 respectively in at least one time slot. In each case, eight time slots together form a frame. FIG. 2 illustrates a first frame 30, a second frame 40, a third frame 50, a fourth frame 60, and a fifth and sixth frame 70 and 80 respectively. In this context, the first frame 30 is subdivided into eight time slots 31 to 38, the second frame 48 is correspondingly subdivided into eight time slots 41 to 48 and so on.

To transmit the data from the transmitter/receiver station 1 to the transmitter/receiver device 2 in a given time slot of a frame, one burst is transmitted in each case.

In FIG. 2, a first burst 39 is transmitted in a third time slot 33 of the first frame. Another burst 49 is transmitted in a third time slot 43 of the second frame 40. Accordingly, in the third frame 50 and the fourth frame 60, a third and fourth burst 59 and 69 respectively are once again transmitted in the third time slot 53 and 63 respectively. In each case, four bursts of this kind 39, 49, 59 and 69, which are transmitted in the successive frames 30, 40, 50 and 60, together form a data block.

For the other frames 70, 80 and so on, the use of another time slot between the transmitter/receiver station 1 and the transmitter/receiver device 2 can also be agreed, in order to transmit the next data block, which is once again transmitted between the transmitter/receiver station 1 and the transmitter/receiver device 2 subdivided into four bursts. The transmission of a first data block or a further data block, as described with reference to FIG. 1, therefore extends over four successive frames.

Figure 3:
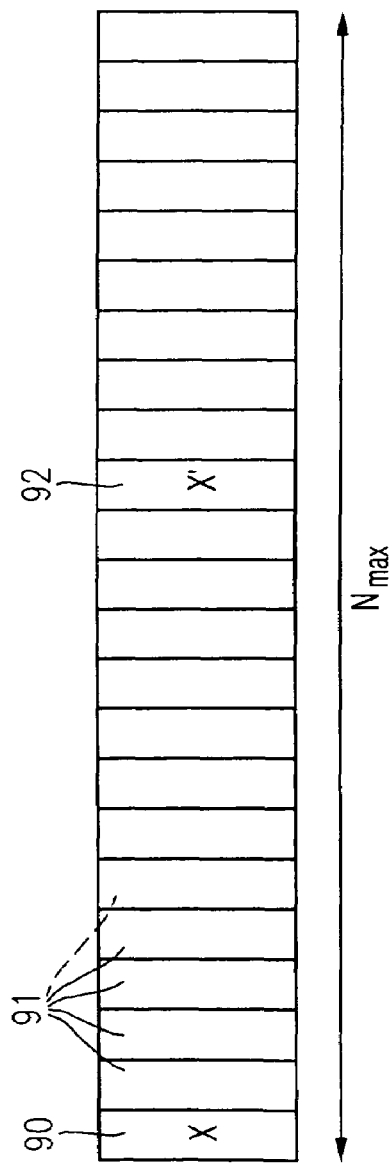
FIG. 3 shows a schematic presentation of the time characteristic in the case of a retransmission of a data block.

Once again in a considerably simplified form, FIG. 3 shows that, after the transmission of a data block 90 of this kind and in response to a request from the transmitter/receiver device 2, other data blocks 91 can be transmitted, before a redundant data block 92 is transmitted and/or, with the method according to the invention, before the same data block is transmitted for a second time in order to determine an error rate. Normally, a given maximum time interval between the data block 90, which has been evaluated as incorrect, and the retransmitted data block 92 must not be exceeded. Because of the defined duration of approximately 20 ms, which an individual data block requires for transmission, this maximum time interval can be indicated as a maximum number of data blocks $N_{max}$, as illustrated in FIG. 3.

Figure 4:
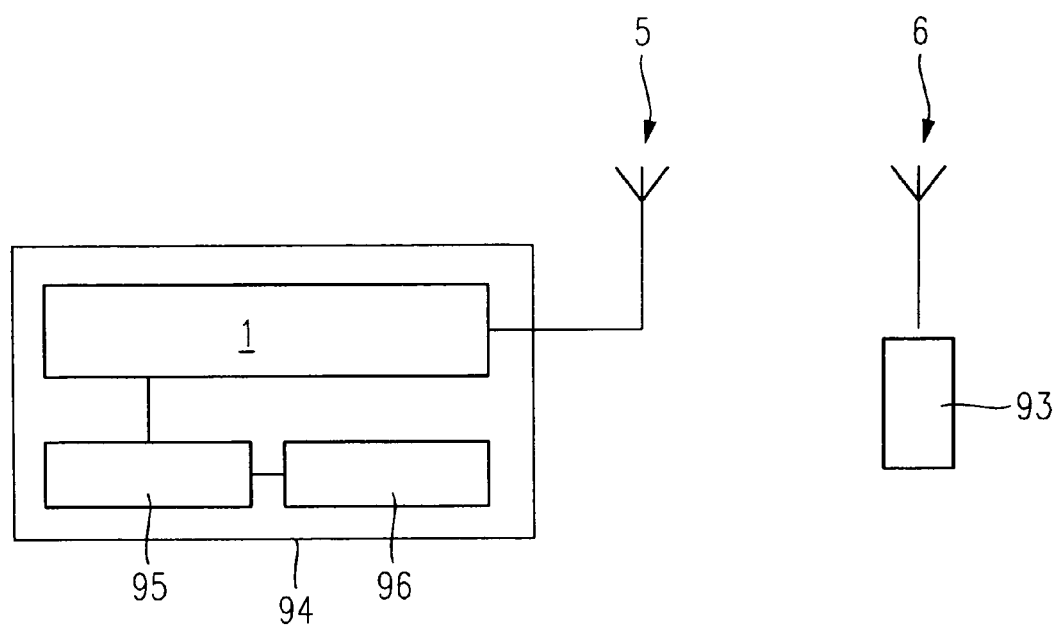
FIG. 4 shows a measuring arrangement with a measuring device according to the invention and a mobile telephone.

FIG. 4 shows an arrangement for determining the error rate of a mobile telephone 93. The mobile telephone 93 in this context provides the transmitter/receiver device 2 illustrated in FIG. 1. The mobile telephone 93 continues to be in radio contact with a measuring device 94, which comprises the transmitter/receiver station 1 also familiar from FIG. 1, wherein the information required for determining the error rate for data blocks received correctly or incorrectly from the mobile telephone 93 is also communicated to the measuring device 94 via the radio connection.

A controller 95, which is connected to the transmitter/receiver station 1 of the measuring device 94, is additionally provided in the measuring device 94. The controller 95 can therefore communicate a given original data block 9, for example, to the transmitter/receiver station 1. Moreover, the controller 95 receives from the transmitter/receiver station 1 the information transmitted via the air interface between the antennae 5 and 6 regarding which data blocks could not be correctly evaluated in their entirety by the decoding block 21.

In this context, the information regarding which data blocks could not be correctly received and evaluated is not normally communicated by the mobile telephone 93 to the measuring device 94 individually for each data block, but is summarized for a number of data blocks received. The error rate is determined by the controller 95 on the basis of the information regarding the number of correctly or incorrectly transmitted data blocks and supplied, for example, for presentation on a display 96.

Additionally, the controller 95 can determine for the transmitter/receiver station 1, that, in order to receive a comparison of the error rates of the mobile telephone 93 with and without incremental redundancy, in response to a request from the mobile telephone 93, another data block different from the data block but redundant to the data block is transmitted instead of the retransmission of the same data block. The result of this additional evaluation is then also presented on the display 96.

In the event of a measurement without incremental redundancy, the punctuation scheme used to generate the first data block and also therefore the data blocks to be retransmitted can preferably be determined in a variable manner by the measuring device 94. A corresponding input is supplied by the controller 95 to the transmitter/receiver device 1 and taken into consideration in selecting the data blocks to be transmitted by the selection device 16. If the memory positions 15.1 to 15.3 are occupied with identical data blocks, the punctuation scheme determined by the controller 95 is already taken into consideration in the storage of the data blocks.

While the present invention has been described in connection with a number of embodiments and implementations, the present invention is not so limited but covers various obvious modifications and equivalent arrangements, which fall within the purview of the appended claims.

What is claimed is:

1. A method for determining an error rate in a data transmission from a transmitter/receiver station to a transmitter/receiver device, wherein a first data block and at least one further, redundant data block different from the first data block are generated by the transmitter/receiver station from an original data block and, in the event of an error transmission of the first data block, a further, redundant data block is requested by the transmitter/receiver device, comprising the steps of:

transmitting a first data block by the transmitter/receiver station, receiving the first data block by the transmitter/receiver device, decoding the first data block received in a decoding block, checking the first data block for transmission errors, requesting a further, redundant data block for error correction, if an error is determined in the transmitted data of the first data block, receiving the request in the transmitter/receiver station, retransmitting the first data block, and determining the rate of the incorrectly received first data blocks, without error correction, and wherein a further, redundant data block is additionally transmitted by the transmitter/receiver station in the event of a request for a further data block, in order to compare the determined error rate without error correction with an error rate with error correction by incremental redundancy.

2. A method according to claim 1, wherein the first data block and the further, redundant data blocks are generated by convolutional coding with different punctuation schemes.

3. A method according to claim 2, wherein the punctuation scheme used for the generation of the first data block is determined.

4. A method according to claim 1, wherein the different, redundant data blocks are stored in a memory of the transmitter/receiver station and that the first data block stored in a memory position assigned to the first data block is transmitted in the event of a request for the further data block.

5. A method according to claim 1, wherein the first data block is also stored in a memory of the transmitter/receiver station instead of the different, redundant data blocks and in their respective memory positions, and that the data block stored in the respective memory position is transmitted in the event of a request for a further data block.

6. A measuring device for determining an error rate in the event of a data transmission from a transmitter/receiver station to a transmitter/receiver device, comprising:

a coding block for generating from an original data block a first data block and at least one further, redundant data block different from the first data block, and a selection device for selecting a data block to be transmitted, wherein the first data block is retransmitted by the transmitter/receiver station in response to a request for a further, redundant data block communicated by the transmitter/receiver device to the transmitter/receiver station because of a error transmission of the first data block, and an error rate of the incorrectly received first data blocks is determined without error correction, wherein a further, redundant data block is selected by the selection device in the event of a request by the transmitter/receiver device in order to compare the determined error rate without error correction with an error rate with error correction by incremental redundancy.

7. A measuring device according to claim 6, wherein a memory with several memory positions is provided in the coding block for the storage of data blocks.

8. A measuring device according to claim 7, wherein different punctuation schemes are used for the generation of the respective data blocks, and that the punctuation scheme used for the generation of the first data block can be selected.

9. A measuring device according to any one claim 6, wherein the first data block can be selected by the selection device from the memory, where it is stored, independently of the request from the transmitter/receiver device.

10. A measuring device according to claim 6, wherein the first data block is stored instead of the further, different, redundant data blocks at their respective memory positions in a memory.

* * * * *